United States Patent [19]

Wong

[11] Patent Number: 4,673,505

[45] Date of Patent: Jun. 16, 1987

[54] WASTEWATER TREATMENT BACTERIAL ADDITIVE

[75] Inventor: John M. Wong, Cleveland, Ohio

[73] Assignee: Envirodyne, Inc., Manistee, Mich.

[21] Appl. No.: 836,141

[22] Filed: Mar. 4, 1986

[51] Int. Cl.$^4$ .......................... C02F 3/34; C12N 1/04; C12N 1/20; C12N 1/36

[52] U.S. Cl. .................... 210/611; 210/620; 210/631; 435/244; 435/245; 435/253; 435/260

[58] Field of Search ............... 210/610, 611, 764, 631, 210/620; 435/184, 188, 244, 245, 253, 260, 264, 267, 800

[56] References Cited

U.S. PATENT DOCUMENTS

| | | | |
|---|---|---|---|
| 3,963,576 | 6/1976 | Horsfall, III et al. | 435/260 |
| 4,250,254 | 2/1981 | Modrovich | 435/188 |
| 4,391,887 | 7/1983 | Baumgarten et al. | 210/610 |
| 4,430,427 | 2/1984 | Hopkins | 435/188 |

FOREIGN PATENT DOCUMENTS 57-71695  5/1982  Japan ................................. 210/601

*Primary Examiner*—Benoit Castel
*Attorney, Agent, or Firm*—Birch, Stewart, Kolasch & Birch

[57] ABSTRACT

The use of an inorganic azide compound as an inhibitor for a wastewater treatment bacterial additive composition. The inorganic azide compounds used in the invention serve to confer a useful life for the bacterial additive composition, yet a relatively short reactivation time which is of great advantage in wastewater treatment systems with short detention times. The inorganic azide compounds employed as an inhibitor in the bacterial composition additives of the invention include alkali metal azides, alkaline earth metal azides, lead azide and hydrazoic acid.

12 Claims, No Drawings

WASTEWATER TREATMENT BACTERIAL ADDITIVE

BACKGROUND AND FIELD OF THE INVENTION

A variety of products of a bacterial composition are commercially available for use in improving performance in biological wastewater treatment facilities. In order to be practical for application, each of these products must be provided with a shelf life through some means. Most of the products are freeze dried. These freeze dried products are dormant in the dry state, and require reactivation in aqueous media prior to addition to wastewater. Other products are liquid suspensions. Liquid products require the addition of an inhibitor at a concentration sufficient to confer self life. When the liquid suspension with chemical inhibitor is added to wastewater, dilution occurs which lowers the concentration of the inhibitor below that required for dormancy of the bacteria. Once the level of inhibitor is diluted to below the minimum level required, the bacteria reactivate, metabolize, and grow. The liquid suspension inhibited as above has an advantage over the freeze-dried product since no separate reactivation stage is required. One simply adds the liquid suspension to the media requiring treatment.

A key consideration for either freeze dried or liquid bacterial preparations is the time lag between addition to the wastewater and subsequent release of inhibition and resumed growth.

For the liquid product, release of inhibition begins with addition to wastewater. For flow-through systems, in which the detention time of any material added to the system may be a matter of hours, a short time lag before reactivation is absolutely necessary.

U.S. Pat. No. 3,963,576 of Horsfall, et al. is directed to an inhibitor for a liquid bacterial suspension and discusses the use of sulfides of sodium or potassium for this purpose.

The present invention is directed to the use of an inhibitor that confers a useful shelf life, but also provides a reactivation time which is approximately one half of the time associated with similar sulfide inhibited systems, providing a substantial advantage in systems with short detention times.

DETAILED DESCRIPTION OF THE INVENTION

This invention encompasses the choice of bacterial compositions and growth conditions to create a liquid suspension and method for rendering the suspension dormant, yet capable of rapid regeneration. Specifically, the invention includes:

1. Growth of a combination of various bacteria, for example, Bacillus, Pseudomonas, Serratia, Myxobacter, Nitrosomonas, Nitrobacter, and/or Thiobacillus bacteria.
2. Addition of a chemical inhibitor, specifically a sufficient amount of an azide ($-N_3$) compound to cause the suspension to be metabolically dormant. The amount of chemical inhibitor to be added to the suspension of microorganisms is suitably 0.002% to 0.02% azide ion by weight of the liquid bacterial suspension. The amount of azide ion employed as the inhibitor provides a useful shelf life to the bacterial suspension while permitting a short reactivation time upon introduction of the suspension to the wastewater.
3. A factor influencing rate of reactivation of Bacillus bacteria is spore formation. The use of a sulfide inhibitor, as in U.S. Pat. No. 3,963,576, induces spore formation in Bacillus bacteria within several hours of sulfide addition. When Bacillus bacteria in the spore form are added to wastewater, up to 12 hours are required before the Bacillus bacteria germinate, i.e., change from spore form to the actively metabolizing form. The addition of the azide inhibitor in accordance with the present invention does not induce spore formation in the Bacillus bacteria, thereby permitting a very short reactivation time of, e.g., about 30 minutes.

The chemical additives used for inhibition in the present invention are inorganic azide compounds. Suitable azide compounds include alkali metal azides such as sodium azide and potassium azide, alkaline earth metal azides such as calcium azide and magnesium azide, other metal azides such as lead azide and hydrazoic acid ($HN_3$).

The bacterial suspension to which the azide compound is added is produced by techniques well known in the art. The bacteria are grown under aerobic conditions in an aqueous nutrient medium which includes appropriate sources of carbon, nitrogen and phosphorus as exemplified below. The azide compound additive is added to the bacteria, whether a single or mixed culture, upon attainment of stationary growth. As stated above, the amount of azide additive is about 0.002% to 0.02% by weight based on the weight of the bacterial suspension.

The inhibited bacterial suspension may be stored for at least about 60 days depending upon the amount of azide added, the species of bacteria in the suspension, the temperature of storage, exposure to air during storage and like factors. The inhibited bacterial suspension may typically be stored in 55 gallon drums and transported to the wastewater treatment site for use. Upon addition of the inhibited bacterial suspension to the reaction vessel used for treating the wastewater, the bacteria are reactivated within about 30 minutes within the treatment facility.

Use of the inhibited bacterial suspension of the invention enhances wastewater treatment objectives such as removal of biochemical oxygen demand (BOD), oxidation of ammonia, conversion of organic acids such as acetic acid in the presence of nitrates to molecular nitrogen and $CO_2$, etc. Therefore, the invention provides a convenient means for introducing specific bacteria with specific capabilities into wastewater treatment systems with specific pollutant removal requirements.

The following Examples are given merely as illustrative of the present invention and are not to be considered as limiting. Unless otherwise noted, the percentages recited therein are by weight.

Comparative tests

EXAMPLE 1

In order to test for stability of the product as well as relative reactivation time, the following experiments were performed. A mixture of *Bacillus subtilis, Bacillus amyloliquefaciens* and *Pseudomonas aeruginosa* was grown using the following aqueous nutrient medium:

| | |
|---|---|
| 0.2% | Sodium Citrate |
| 0.1% | KH$_2$PO$_4$ |
| 0.05% | MgSO$_4$ |
| 0.1% | Yeast Extract |
| 0.1% | NH$_4$Cl |

The nutrients were dissolved in 10% tap water and 90% deionized water to make up 500 gallons of the above solution. The solution was sterilized at 15 pounds steam pressure for 15 minutes. After cooling to 98° F., the nutrient medium was inoculated with the mixture of Bacillus and Pseudomonas bacteria noted above and aeration was begun.

At 30 hours of growth, three 55 gallon drums of the bacterial suspension were filled from the aerobic reactor. Characterization of the suspension at the 30 hour sampling time was as follows:
1. Total bacterial count, $1 \times 10^7$ cells/ml
2. Soluble Chemical Oxygen Demand (COD) of filtrate after passing suspension through 0.5 micron filter, 650 mg/l The three 55 gallon drums were then inhibited with chemical additives as follows:

| Drum Number | Chemical Added | Grams Added |
|---|---|---|
| 1 | Sodium Sulfide | 20 |
| 2 | Sodium Azide | 20 |
| 3 | No Addition | — |

The drums were sealed, and the suspension in each drum was allowed to age for 30 days.

After aging for 30 days, the drums were agitated for 15 minutes to provide thorough mixing, and were retested for bacterial count and soluble Chemical Oxygen Demand (COD). The results were as follows:

| Drum Number | Inhibitor Used | Bacterial Count/ml | Soluble COD, mg/l |
|---|---|---|---|
| 1 | Sodium Sulfide | $9.6 \times 10^6$ | 625 |
| 2 | Sodium Azide | $9.1 \times 10^6$ | 575 |
| 3 | None | $6.0 \times 10^6$ | 130 |

As shown above, Drum 3 with no inhibitor continued to metabolize, consuming 80% of soluble COD present from initial sampling time to the end of the 30 day aging period (650 mg/l at initial sampling, 130 mg/l after 30 days of aging). Further, the bacterial count decreased from $1 \times 10^7$ to $6.0 \times 10^6$, indicating 40% death rate during the 30 day period. In contrast, the sulfide treated suspension and azide treated suspension consumed only 3.8% and 11.5% respectively of the soluble COD, while showing a death rate of 4% for the sulfide treated suspension and 9% for the azide treated solution. These data obviously show that treatment with both azide and sulfide is effective in creating a dormant suspension of bacteria relative to an uninhibited suspension.

In order to test for time lag between dilution into wastewater and reactivation, the following experiment was performed. A nutrient broth was prepared, consisting of:

| | |
|---|---|
| 0.1% | NH$_4$Cl |
| 0.1% | KH$_2$PO$_4$ |
| 0.05% | MgSO$_4$ |
| 0.05% | Sodium Acetate |
| 0.05% | Glucose |
| 0.05% | Sodium Citrate |
| 0.1% | Yeast Extract |

The above ingredients were dissolved in 10% tap water and 90% deionized water, sterilized for 15 minutes at 15 pounds steam pressure, placed under aeration and inoculated with 1000 ppm (volumetric) of suspension from each of Drums 1, 2 and 3. At the time of inoculation, each drum had been aged for 35 days.

Absorbance was used to determine reactivation time. Distilled water was used to zero the apparatus, and the sterilized nutrient broth had an absorbance of 85. Subsequent to inoculation, the aerated samples were checked for absorbance at 20 minute intervals. An increase in absorbance indicates that growth (reactivation) is occurring. The data are presented in Table 1:

TABLE 1

| Time (Hours) | Drum 1 (Sulfide) | Drum 2 (Azide) | Drum 3 (No Inhibitor) |
|---|---|---|---|
| 0 | 85 | 85 | 85 |
| 1 | 84 | 85 | 82 |
| 2 | 86 | 92 | 84 |
| 3 | 85 | 148 | 87 |
| 4 | 90 | 225 | 98 |
| 5 | 112 | 272 | 122 |
| 6 | 152 | 335 | 145 |
| 7 | 185 | 362 | 151 |
| 8 | 228 | 402 | 160 |

From the above, it is clear that the suspension inhibited with azide reactivated within 2 to 3 hours, that the suspension inhibited with sulfide reactivated within 4 to 5 hours, and that the sample aged 35 days with no inhibitor showed substantially less growth than either of the inhibited samples. It is important to note that the sample inhibited with azide not only reactivated in half the time as did the sulfide sample, but demonstrated a more rapid growth rate upon release of inhibition. As previously explained, this shorter reactivation time is a tremendous advantage of the azide inhibitor system relative to the prior art sulfide system, especially in flow through systems with short retention times.

EXAMPLE 2

As mentioned previously, induction of sporulation of Bacillus organisms resulting from sulfide inhibitor increases lag time between addition of the bacterial suspension into the wastewater and its subsequent reactivation and growth. The following experiment was performed to demonstrate the differences relative to induction of sporulation resulting from a comparison of the use of the sulfide and an azide chemical inhibitor.

*Bacillus subtilis* was grown in the same aqueous nutrient medium described in Example 1 under the same conditions for 30 hours. Upon 30 hours of growth, chemical inhibitors were added to various samples in the amount as shown in Table 2.

TABLE 2

| | Sample 1 | Sample 2 | Sample 3 |
|---|---|---|---|
| Sodium sulfide | 0 | 0.013%* | 0.013%* |
| Sodium azide | 0.013%* | 0 | 0.013%* |

*0.5 g/gal

The samples were stored at room temperature (20° C.) for 24 hours to allow spore formation to occur.

After storage for 24 hours using standard gram staining technique slides of each sample were prepared to determine percent of total organisms sporulated. The results of this examination are shown in Table 3.

TABLE 3

| | Sample 1 | Sample 2 | Sample 3 |
|---|---|---|---|
| % sporulation | 15% | 90% | 40% |

From these data it is clear that sulfide inhibition resulted in virtually total sporulation, which delays reactivation, whereas azide inhibition not only failed to induce significant sporulation as seen in Sample 1 but appeared to prevent significant sporulation when used in combination with sulfide as shown with Sample 3.

To demonstrate the advantage of this phenomenon, 1 ml aliquots of Samples 1 and 2 were used to inoculate one liter samples of aqueous nutrient media having a composition as described in Example 1 and grown up under the same conditions. Absorbance was again used as a measurement of bacterial growth. Absorbance was measured at the intervals shown in Table 4.

TABLE 4

| Absorbance at hour of growth (Klett units) | Sample 1 | Sample 2 |
|---|---|---|
| 0 | 80 | 80 |
| 1 | 105 | 80 |
| 2 | 135 | 80 |
| 4 | 175 | 82 |
| 6 | 255 | 86 |
| 12 | 310 | 85 |
| 14 | 345 | 128 |
| 24 | 460 | 256 |

From these data it can be seen that the Sample 2 treated with sulfide inhibitor and consisting of 90% spores did not show appreciable growth until 12 hours had elapsed. To the contrary Sample 1 treated with azide inhibitor and consisting of 15% spores showed growth (reactivation) in only 1 hour. Obviously, in a wastewater treatment system with a retention time of, e.g., 6 hours, addition of azide-inhibited Bacillus would provide a useful function in the treatment process whereas the addition of sulfide-inhibited Bacillus would be of no value.

It is clear from the foregoing that the use of inorganic azide compounds as inhibitors confers a useful shelf life, maintains a high viable bacterial population for at least 60 days and, in the case of Bacillus, provides a significant advantage in terms of reactivation time in a wastewater treatment system.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

I claim:

1. An aqueous suspension of inhibited bacteria comprising aerobic bacteria capable of degrading organic materials which exert biochemical oxygen demand, water and an effective inhibiting amount of about 0.002 to 0.02% by weight based on the weight of the aqueous bacterial suspension of an inorganic azide compound.

2. The aqueous suspension of claim 1, wherein said bacteria are selected from the group consisting of bacteria belonging to Bacillus, Pseudomonas, Serratia, Myxobacter, Nitrosomonas, Nitrobacter, Thiobacillus and mixtures thereof.

3. The aqueous suspension of claim 1, wherein said inorganic azide compound is at least one member selected from the group consisting of alkali metal azides, alkaline earth metal azides and lead azide.

4. The aqueous suspension of claim 1, wherein said azide compound is hydrazoic acid.

5. The aqueous suspension of claim 1, wherein said azide compound is sodium azide.

6. The aqueous suspension of claim 5, wherein the amount of sodium azide in the bacterial suspension is from about 0.002 to 0.02% by weight.

7. In a method for the treatment of wastewater, the improvement which comprises adding an aqueous suspension of inhibited bacteria comprising aerobic bacteria capable of degrading organic materials which exert biochemical oxygen demand, water and an effective inhibiting amount of about 0.002 to 0.02% by weight based on the weight of the aqueous bacterial suspension of an inorganic azide compound to a reaction vessel in which the wastewater is being degraded.

8. The process of claim 7, wherein said bacteria are selected from the group consisting of bacteria belonging to Bacillus, Pseudomonas, Serratia, Myxobacter, Nitrosomonas, Nitrobacter, Thiobacillus and mixtures thereof.

9. The process of claim 7, wherein said inorganic azide compound is at least one member selected from the group consisting of alkali metal azides, alkaline earth metal azides and lead azide.

10. The process of claim 7, wherein said azide compound is hydrazoic acid.

11. The process of claim 7, wherein said azide compound is sodium azide.

12. The process of claim 11, wherein the amount of sodium azide in the bacterial suspension is from about 0.002 to 0.02% by weight.

* * * * *